United States Patent [19]

Hohenshil et al.

[11] Patent Number: 5,271,598
[45] Date of Patent: Dec. 21, 1993

[54] PNEUMATIC IMPULSE VALVE AND SEPARATION SYSTEM

[75] Inventors: Robert N. Hohenshil; James C. Putt, both of Doylestown, Ohio

[73] Assignee: The B. F. Goodrich Company, Akron, Ohio

[21] Appl. No.: 954,097

[22] Filed: Sep. 30, 1992

[51] Int. Cl.[5] .............. F16K 31/40; B64D 15/16
[52] U.S. Cl. .................. 251/29; 137/624.14; 244/134 A; 251/30.05
[58] Field of Search ............... 137/624.14; 244/134 A; 251/29, 30.05

[56] References Cited

U.S. PATENT DOCUMENTS

| | | | |
|---|---|---|---|
| 4,201,362 | 5/1980 | Nishimi et al. | 251/29 |
| 4,706,911 | 11/1987 | Briscoe et al. | |
| 4,747,575 | 5/1988 | Putt et al. | 137/624.14 X |
| 4,826,108 | 5/1989 | Briscoe et al. | |
| 4,836,474 | 6/1989 | Briscoe et al. | |
| 4,878,647 | 11/1989 | Putt et al. | 251/29 X |
| 5,098,061 | 3/1992 | Hohenshil et al. | 251/30.05 |

Primary Examiner—Gerald A. Michalsky
Attorney, Agent, or Firm—Richard A. Romanchik

[57] ABSTRACT

An improved high pressure impulse valve includes a pilot section, an intermediate section, and an output section which are pressurized to approximately equilibrium with the inlet pressure during a load portion of the operating cycle and which cooperate to provide extremely rapid full opening of the output section to release fluid under pressure from an accumulator through an output section piston seat. The valve is particularly suitable for use in combination with pneumatic impulse separation systems such as those employed for deicing aircraft surfaces.

19 Claims, 2 Drawing Sheets

PNEUMATIC IMPULSE VALVE AND SEPARATION SYSTEM

FIELD OF THE INVENTION

This invention relates to a pneumatic impulse valve and a fluid impulse separation system including such a valve. More particularly, this invention pertains to an extremely rapid acting valve capable of delivering an impulse of compressible fluid and to a fluid impulse separation system suitable for deicing of aircraft leading edge surfaces.

BACKGROUND OF THE INVENTION

From the beginning of powered aviation, aircraft have been under certain flying conditions troubled by accumulations of ice on component surfaces of aircraft such as wings and struts. If unchecked, such accumulations can eventually so laden the aircraft with additional weight and so alter the airfoil configuration of the wings and control surfaces of that aircraft so as to precipitate an unflyable condition. Efforts to prevent and/or remove such accumulations of ice under flying conditions has resulted in three generally universal approaches to removal of accumulated ice, a process known generally as de-icing.

In one form of de-icing known as thermal de-icing, leading edges, are heated to loosen adhesive forces between accumulating ice and the aircraft component. "Leading edges" as used herein means those edges of an aircraft component on which ice accretes and are impinged upon by air flowing over the aircraft and having a point or line at which this airflow stagnates. Once loosened, this ice is generally blown from the aircraft component by the airstream passing over the aircraft. There are two popular methods of heating leading edges. In one approach known as electrothermal de-icing, an electrical heating element is placed in the leading edge zone of the aircraft component, either by inclusion in a elastomeric boot applied over the leading edge or by incorporation into the skin structure of the aircraft component. This heating element is typically powered by electrical energy derived from a generating source driven by one or more of the aircraft engines and is switched on and off to provide heat sufficient to loosen accumulating ice. In small aircraft, a sufficient quantity of electrical power may be unavailable for use of electrothermal de-icing. In the other heating approach, gases at elevated temperature from one or more compression stages of a turbine engine are circulated through the leading edges of components such as wings and struts in order to affect a de-icing or anti-icing effect. This approach is employed typically only in aircraft powered by turbine engines by draining off compressed air having an elevated temperature from one or more compressor stations of a turbine engine. This approach can result in reduced fuel economy and lower turbine power output.

The second commonly employed method for de-icing involves chemicals. In limited situations, a chemical has been applied to all or part of an aircraft to depress adhesion forces associated with ice accumulation upon the aircraft or to depress the freezing point of water collecting upon surfaces of the aircraft.

The remaining commonly employed methods for de-icing are typically termed mechanical de-icing. One mechanical means for effecting ice de-icing includes electromechanical hammering such as that described in U.S. Pat. No. 3,549,964 to Levin et al. Concern respecting the susceptibility of the airfoil skin to stress fatigue upon being hammered over extended periods of time have functioned in part to preclude substantial commercial development or adoption of such technique.

Another electromechanical ice removal system is described in U.S. Pat. No. 4,690,353 to Haslim et al. One or more overlapped flexible ribbon conductors, each of which is folded back on itself, is embedded in an elastomeric material. When a large current pulse is fed to the conductor, the anti-parallel currents in the opposed segments of adjacent layers of the conductor result in interacting magnetic fields producing an electrorepulsive force between the overlapping conductor segments causing them to be separated near instantaneously. This distention tends to remove any solid body on the surface of the elastomeric material.

The principal commercial mechanical de-icing means, however, is termed pneumatic de-icing wherein the leading edge zone or wing or strut component of an aircraft is covered with a plurality of expandable, generally tube-like structures, inflatable employing a pressurized fluid, typically air. Upon inflation, the tubular structures tend to expand substantially the leading edge profile of the wing or strut and crack ice accumulating thereon for dispersal into the airstream passing over the aircraft component. Typically, these tube-like structures have been configured to extend substantially parallel to the leading edge of the aircraft. These conventional low pressure pneumatic de-icers are formed from compounds having rubbery or substantially elastic properties. Typically, the material forming the inflatable tubes on such de-icer structures can expand or stretch by 40% or more during an inflatable cycle, thereby causing a substantial change in the profile of the de-icer as well as in the leading edge to thereby crack ice accumulating on the leading edge. These conventional pneumatic de-icers require a large volume of air to inflate their highly expandable tubes and the time for inflating such tubes typically and historically has averaged from about two and six seconds. The distortion of the airfoil profile caused by inflation of the tubes can substantially alter the airflow pattern over the airfoil and adversely affect the lift characteristics of the airfoil. The rubber or rubber-like materials forming these conventional pneumatic de-icers typically are possessed of a Young's modulus (modulus of elasticity) of approximately 6900 Kpa. The modulus of elasticity of ice is variously reported as being between about 275,000 Kpa and about 3,450,000 Kpa. Ice is known to be possessed of an elastic modulus enabling typical ice accumulations to adjust to minor changes in contours of surfaces supporting such ice accumulations. While the modulus of elasticity of rubber compounds used in conventional de-icers is much lower than the modulus of elasticity typically associated with ice accumulations. The large expansion of conventional pneumatic de-icers has functioned to crack or rupture the structure of the ice accumulations thereby allowing such accumulations to be swept away by impinging windstreams.

U.S. Pat. Nos. 4,706,911 to Briscoe et al., 4,747,575 to Putt et al. and 4,878,647 to Putt et al. disclose pneumatic apparatus for de-icing leading edges in which an impulse of fluid under pressure is utilized to rapidly inflate an inflation tube positioned between a support surface and a sheet-like skin possessed of a substantially elevated modulus. The impulse of fluid is delivered to the inflation tube causing the high modulus skin to dislocate and then stop suddenly. Momentum imparted to the ice accumulations thereby causes additional ice movement which assists in ice detachment and dislodgement. The inflatable tubular structure in certain preferred embodiments is inflated within in not more than about 0.1 second and preferably not more than about 0.5 milliseconds. FIG. 4 and the attendant description of U.S. Pat. No 4,706,911 describe an ejector/pilot operated impulse de-icers. In FIG. 7 and the attendant description of U.S. Pat. No. 4,747,575 there is described a chattering valve for use in a pneumatic impulse de-icer which delivers a rapid series of fluid pressure pulses to the inflatable tube of a deicer apparatus affixed to a leading edge. In FIG. 1 and the attendant description of U.S. Pat. No. 4,878,647 there is described a three stage valve which delivers a high impulse fluid pressure pulse to the inflatable tube of a de-icer apparatus affixed to a leading edge. Efforts to improve such pneumatic impulse de-icing systems have led to continuing efforts to improve the efficiency and reliability of valves for delivery of the desired fluid impulse.

SUMMARY OF THE INVENTION

According to an aspect of the present invention, there is provided an improved valve comprising pilot, intermediate and output sections, the pilot section including a pilot housing containing a pilot cavity, inlet conduit means extending from the exterior of the pilot housing to the pilot cavity, exhaust conduit means extending from the pilot cavity to the exterior of the pilot housing, and intermediate conduit means extending from the pilot cavity to said intermediate section, gate means configured for movement from a load position during which the inlet conduit means is in fluid communication with said intermediate conduit means and a discharge position during which the exhaust conduit means is in fluid communication with said intermediate conduit means while said inlet conduit means is disconnected from said intermediate conduit means;

the intermediate section including an intermediate housing containing an intermediate cavity having an inlet port in fluid communication with said intermediate conduit means, an exhaust vent, and an outlet port in fluid communication with output conduit means, the outlet port being proximate to the exhaust vent, and a poppet contained within said intermediate cavity configured for movement from a load position during which fluid under pressure may enter the intermediate cavity and force the poppet to seal off movement of fluid into the exhaust vent while permitting flow of fluid to the outlet port and a discharge position during which fluid under pressure may flow from said output conduit means to said exhaust vent;

the output section including an output housing containing an output cavity having an inlet orifice in fluid communication with said output conduit means, an outlet and accumulation means having an opening to said output cavity proximate to said outlet, and a piston contained within said output cavity configured for movement from a load position during which fluid under pressure may enter the output cavity through said inlet orifice and force the piston to seal off movement of fluid into the outlet while permitting flow of fluid into the accumulation means, and a discharge position during which fluid under pressure may flow from said accumulation means to said outlet, characterized by:

said poppet having: a) a first bleed duct to allow restricted communication of fluid between said intermediate cavity and said output port; b) a first sealing means to prevent leakage of fluid from said intermediate cavity and said output port from any way other than said bleed duct;

said piston being comprised of: a) an actuator for being reciprocally received within said output cavity, a neck having at least three legs with each leg having a tip surface extending radially outward from said neck, said neck being reciprocally received within said accumulator means by means of contact between each one of said tips with said accumulator means, and a sealing face for sealing off movement of fluid into said outlet while said piston is in the load position.

In preferred embodiments, the poppet and associated intermediate cavity are of cylindrical shape and the end of the poppet facing the exhaust vent includes a frustoconical face capable of sealing against flow from the intermediate cavity when engaged with the poppet seat. In like manner, the piston and associated output cavity are of a generally cylindrical shape and the end of the piston facing the outlet includes a frustoconical face capable of sealing against fluid flow from the output cavity when engaged with the piston seat. The inclusion of these frustoconical sealing faces serve to accelerate the opening of the valve because as pressure is released from the intermediate and output cavities and the poppet and piston respectively begin to move away from their corresponding annular seats, a greater area is presented to the escaping fluid causing an even greater force to be exerted on the poppet and piston moving them even more rapidly away from their seated positions.

In one embodiment, the housing is unitary and is formed of metal, and the poppet and piston are formed of plastic material.

In a preferred embodiment, the housing is unitary and is formed of metal, the poppet is formed of plastic material, and piston is formed of metal, such as aluminum or an aluminum alloy with the tip inserts 88 being formed of plastic material.

In a preferred embodiment, the gate means is comprised of a ball seat means, a ball, an actuator rod for pushing said ball in engagement with said ball seat means, and an O-ring means located adjacent said ball seat means opposite said ball for providing a spring force against said ball seat to dampen impact of said ball against said ball seat means.

According to a further aspect of the present invention, there is provided in combination a valve as aforedescribed and a fluid impulse separation apparatus which includes an outer surface layer formed of a material having Young's modulus of at least 40,000 Kpa and a least one inflatable tubular member beneath the outer surface layer positioned such that fluid impulse inflation of the tubular member causes reaction movement of the outer surface layer to effect separation and dislodgement of any material lying thereon such as ice.

The above and other features and advantages of the invention will become more apparent when considered in light of the following description of a preferred embodiment of the invention, in conjunction with the accompanying drawings which also form a part of the specification.

DETAILED DESCRIPTION OF PREFERRED EMBODIMENTS

Figure 1:
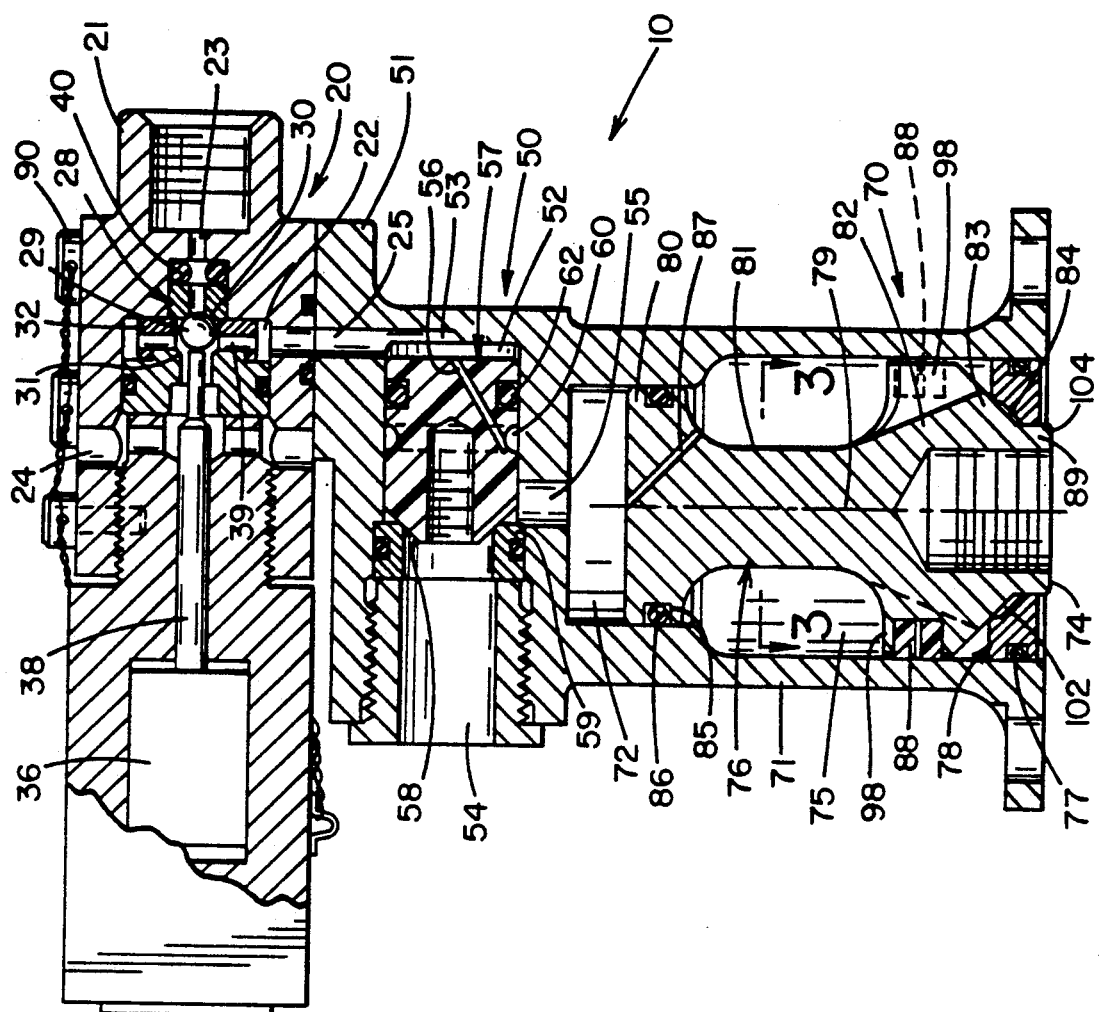
FIG. 1 is a side elevational view in partial cross section of a valve in accordance with the present invention.

Referring to FIG. 1, a valve 10 including a pilot section 20, an intermediate section 50 and an output section 70 is depicted. The pilot section 20 includes a pilot housing 21 which contains a pilot cavity 22. Inlet conduit means 23 extends from the exterior of the pilot housing 21 to the pilot cavity. Exhaust conduit means 24 extends from pilot cavity 22 to the exterior of the pilot housing. Intermediate conduit means 25 extends from the pilot cavity 22 and terminates in inlet port 53 of the intermediate cavity 52. Pilot section 20 also includes gate means 28 which are configured for movement from a discharge position as shown in FIG. 1 during which the exhaust conduit means 24 is in fluid communication with the intermediate conduit means 25 and a load position (not shown) during which the inlet conduit means 23 is in fluid communication with said intermediate conduit means 25. When gate means 28 is in the discharge position, the inlet conduit means 23 is sealed off and disconnected from intermediate conduit means 25. In the preferred embodiment shown, gate means 28 includes a ball 29 of stainless steel which is urged into the load position by pressurized fluid provided from a source (not shown) through inlet port 21 and inlet conduit means 23 wherein the ball 29 is in contact with the annular exhaust conduit seat 31 of exhaust conduit means 24 during the load portion of the valve operating cycle.

A conventional electrical solenoid 36 is affixed to the pilot section 20 of valve 10, such that when the solenoid is not energized the core rod 38 has its distal end positioned inside an annular exhaust conduit seat 31 so as not to interfere with ball 29 seating in exhaust conduit seat 31 and sealing off fluid communication between exhaust conduit means 34 and pilot cavity means 22. Upon energization of the solenoid 36 core rod 38 is driven away from solenoid 36 to push ball 29 off seat 31 and onto an annular inlet conduit seat 30. A spacer 32 serves to constrain the movement of the ball 29 in line between seats 30 and 31. An O-ring 40 is disposed behind inlet conduit seat 30 to absorb the shock imposed on ball 29 and seat 30 when core rod 38 strikes ball 29. It has been found that the forces imposed on core rod 38, ball 29 and seat 30 in prior valves deteriorated these pieces quickly thereby necessitating frequent maintenance overhauls. The O-ring of the present invention alleviates this problem. Also, springs and plungers were utilized in the prior art to force ball 29 onto exhaust conduit seat 31 during the load position. It was discovered by the present applicants that elimination of these parts in the embodiment of the present invention does not inhibit the function of the gate means yet it reduces the number of components susceptible to failure.

Spacer 32 includes a plurality of radially extending passages 39 to facilitate passage of fluid between the pilot cavity 22 and intermediate conduit means 25. Spacer 32 is configured to enable fluid flow from inlet conduit means 23 into pilot cavity 22 through inlet conduit seat 30 and O-ring 40.

Intermediate section 50 includes an intermediate housing 51 connected with the housing of pilot section 20 and output section 70. The intermediate section 50 includes an intermediate cavity 52 which has an inlet port 53 that is in fluid communication with the intermediate conduit means 25. At the opposite end of the intermediate cavity is annular poppet seat 59 which opens into exhaust vent 54. Proximate to exhaust vent 54 is an outlet port or conduit means 55 which extends at substantially a right angle to the common axial center line of the cylindrical intermediate cavity and exhaust vent. A cylindrical poppet 57 is reciprocally contained within intermediate cavity 52. Poppet 57 is configured for movement from a load position as shown in FIG. 1 to a discharge position (not shown) during which poppet is shifted to a position away from poppet seat 59, that is toward the right with respect to the view shown in FIG. 1. Poppet 57 includes a frustoconical end face 58 capable of sealing against movement of fluid into exhaust vent 54 when in contact with annular poppet seat 59. Poppet 57 also includes a poppet bleed hole or duct 56 which extends therethrough from the intermediate cavity 52 to an annular groove 60 in the poppet 57. The outer diameter of poppet 57 should be smaller than the diameter of intermediate cavity 52 so that poppet bleed duct 56 and annular groove 60 put the intermediate cavity 52 in fluid communication with the outlet port 55. The diameter of poppet bleed duct 56 should be small enough so as to allow fluid to flow from intermediate cavity 52 to outlet port 55 while poppet 57 is in the load position, yet not interfere with the exhausting of fluid out exhaust vent 54 when poppet 57 is in the discharge position. The preferred diameter of poppet bleed duct 56 is on the order of 0.026 inches. Poppet 57 is shown in FIG. 1 in its load position during which fluid under pressure may enter intermediate cavity 52 by coursing through inlet conduit means 23, pilot cavity 22, intermediate conduit means 25 and poppet duct 56. Poppet 57 has an outside diameter slightly less than the inside diameter of cylindrical intermediate cavity 52. A sealing O-ring 62 is provided on poppet 57 to prevent blow-by of fluid. It is to be noted that the combination of bleed duct 56 and O-ring 62 provide a system which alleviates the necessity of having a close fitting of poppet 57 to intermediate cavity 52 as required in the prior art. It is to be noted that the O-rings of the present invention are preferably made of a high durometer elastomer.

Output section 70 includes an output housing 71 common with that of intermediate section 50 and pilot section 20 as shown. The output section includes an output cavity 72 in fluid communication with output conduit means 55, and an outlet 74 at the opposite end of output cavity 72. An accumulation chamber 75 of predetermined volume proximate to outlet 74 is open to the output cavity 72. The end of the accumulation chamber 75 opposite the output cavity 72 includes an annular piston seat 78. A piston 76 is disposed within output cavity 72 and accumulation chamber 75 for reciprocally moving therein along an axial line 79 and includes: a) a top cylindrical head portion 80 having an outside diameter less than the inside diameter of output cavity 72 for reciprocal movement therein; b) a middle cylindrical neck portion 81 for disposal within accumulation chamber 75 having an outside diameter less than the inside diameter of accumulation chamber 75 for providing an area for accumulation of fluid; c) a bottom portion 82 having at least three legs 98 protruding radially outward from axial line 79 which contact the inner wall of accumulation chamber 75 and maintain piston 76 in axial alignment; and, d) an end portion 83 having a frustoconical end face 84 capable of sealing against the annular piston seat 78 in order to prevent flow of fluid under pressure from accumulation chamber 75 and output cavity 72 when the frustoconical end face 84 is in contact with piston seat 78.

Top cylindrical head portion 80 has a piston bleed hole or duct 87 for bleeding fluid from output cavity 72 into accumulation chamber 75. Piston bleed duct 87 should be small enough so as to allow fluid to flow from output cavity 72 to accumulation chamber 75 while piston 76 is in the load position yet not interfere with the exhausting of fluid out outlet 74 when piston 76 is in the discharge position. The diameter of bleed duct 87 should be on the order of 0.031 inches. The top cylindrical head portion 80 of piston 76 also has an annular groove 85 provided therein for receiving an O-ring 86 which seals against the inner wall, thereby preventing blow-by of fluid from the accumulation chamber 75 around top cylindrical head portion 80 to the output cavity 72.

The difference in diameter between relief of middle cylindrical neck portion 81 of piston 76 and the inner wall of accumulation chamber 75 provides a volume for accumulation of fluid. Such relief also serves to further reduce the mass of the piston thereby increasing the rate of response when the discharge portion of the valve operating cycle is initiated.

Bottom portion 82 preferably has three legs 98 which smoothly protrude radially outward from axial line 79. The smooth or rounded merging of legs 98 with neck portion 81 minimizes stress in the legs and also minimizes air drag of the piston during the discharge cycle. Piston 76 is preferably made of metal, such as aluminum, with wearing inserts 88 provided in the portion of each leg which contacts the accumulation chamber inner walls. Wearing inserts 88 would protrude radially outward slightly from the metal portion of each leg. The preferred material for wearing inserts 88 is a durable plastic, such as polyetheretherketone (PEEK). Piston 76, however, may be made entirely of plastic, such as PEEK, thereby eliminating the necessity of wearing inserts 88.

End portion 83 of piston 76 has a frustoconical surface 84 which merges into a extension portion 89 for being received into the opening of a piston seat 78.

Piston seat 78 has a seating portion 95 (see FIG. 2) for contact with piston 76 and an annular groove 93 (see FIG. 2) for receiving an O-ring 77 for sealing the accumulation chamber 75.

Piston 76 is contained within output cavity 72 and accumulation chamber 75 and is configured for movement from a load position as shown in FIG. 1 to a discharge position (not shown) during which the piston is displaced away from piston seat 78 and toward the output conduit means 55. When in the load position, fluid under pressure may enter the output cavity 72 through output conduit means 55 and fill accumulation chamber 75 by traveling through piston bleed duct 87. When in the discharge position, fluid under pressure in accumulation chamber 75 is free to exit through the annular opening between the frustoconical end face 84 of piston 76 and piston seat 78 into outlet 74.

The valve body or housing may be an integral piece or separate housings (as shown) may be provided for each of pilot, intermediate and output sections, thereby necessitating a connection means 90 for connecting the housings. The housings may be formed of aluminum or steel or other material that is structurally capable of holding the intended pressure. For use in combination with aircraft de-icing apparatus, a preferred material for the housings is aluminum. While anodization is not required to achieve effective functioning and an operational life of more than a million cycles, anodization is preferred to further increase life of the housings against wear and to inhibit corrosion.

The poppet 57 of the intermediate section 50 is preferably formed as a hollow cylindrical body to reduce its mass to a minimum to enable the fastest possible response to initiation of the discharge portion of the valve operating cycle. The poppet 57 is preferably formed of an engineering plastic material. A suitable combination is a poppet and a piston formed of PEEK (polyetheretherketone) in an aluminum housing because this combination exhibits excellent resistance to corrosion, a low coefficient of sliding friction and a good match in coefficient of thermal expansion over the temperature range for which aircraft equipment need be operational.

The use of bleed ducts 56, 87 and O-ring seals 62, 86 in the present invention allows for adequate filling characteristics during the load cycle while allowing greater manufacturing clearances and tolerances than required in prior art valves. When this combination of materials is utilized, the clearance at room temperature of the poppet and piston to their respective bores is preferably on the order of 0.003 inches. A greater clearance may result in a slower acting valve and a lower output pressure pulse if blow-by of O-ring seals 62, 86 occurs. Maximum clearance is believed to be about 0.005 inches. It is to be noted, however, that these clearances are an order of magnitude greater than previously required.

Respecting the pilot section 20, ball 29 is preferably formed of stainless steel, preferably type 440C. Solenoid 36 may be a standard push type 28 volt DC solenoid, the only requirements being that it be dimensioned to fit to the pilot section and have an adequate motion when energized to move the ball off the seat 31 of exhaust conduit 24 and into sealing engagement with seat 30 of inlet conduit 23 and have sufficient force for doing so.

While the invention has been described in regard to a valve having three sections, four or more sections could be employed to achieve even faster discharge response time of the final output section, discharge response time being defined as the time required for the output section piston to go from full-closed to full-open position. The discharge response time of a three section valve as is described above is less than or equal to 0.001 seconds.

In use, valve 10 while in its load position becomes pressurized throughout inlet conduit means 23, pilot cavity 22, intermediate conduit means 25, inlet port 53, intermediate cavity 52, output conduit means 55, output cavity 72, and accumulation chamber 75. Fluid under pressure is able to flow into output cavity 72 and accumulation chamber 75 because of bleed ducts 56 and 87. Typically, this pressure is at least 80 psig and may as high as 5,000 psig or more as desired for the intended application. Ball 29 is in sealing contact with annular seat 31 of exhaust conduit 24 thereby preventing loss of pressure from inlet conduit 23 or intermediate conduit means 25. The preferred fluid to be utilized with the present invention is air, although other compressible fluids may also be used.

The discharge portion of the operational cycle begins with energization of solenoid 36. Energization of solenoid 36 forces core rod 38 against ball 29, driving ball 29 away from exhaust conduit seat 31 and into sealing engagement with seat 30. This opens pilot cavity 22 to exhaust conduit means 24 and seals off inlet conduit means 23 from pilot cavity 22. The fluid pressure in the intermediate cavity 52 is reduced by exhaustion of fluid through intermediate conduct means 25, pilot cavity 22 and exhaust conduit means 24, thereby leaving fluid pressure in output cavity 72 momentarily much more elevated than that of intermediate cavity 52. This pressure differential acts on the area differential defined by the difference in areas of the diameter of intermediate cavity 52 and the diameter of exhaust vent 54, thereby causing the frustoconical end face 58 of poppet 57 to unseat poppet 57 from the poppet seat 59 and thereby causing discharge of pressurized fluid from the output cavity 72 through exhaust vent 54. Reduced pressure upon the flat end face of the head portion 80 of piston 76 leaves the fluid pressure in accumulation chamber 75 momentarily much more elevated than the pressure in output cavity 72. This pressure differential acts on the area differential defined by the difference in areas of the diameter of output cavity 72 and the diameter of the piston seat 78 in contact with piston 76 to thereby lift the piston from piston seat 78 and enable the fluid under pressure in accumulation chamber 75 to be discharged into outlet 74. As the poppet 57 and piston 76 begin to lift from their respective seats 59 and 78, a greater area of their respective frustoconical end faces 58 and 84 is subjected to the fluid pressure differential. This configuration results in what has been referred to as a positive aerodynamic spring rate which causes increasingly rapid acceleration of the poppet 57 and piston 76 as they move away from their respective seats 59, 78 to full-open position at the opposite end of their respective cylindrical cavities 52, 72. As will be described in greater detail hereinafter, during the discharge cycle the configurations of piston end portion 83 and piston seat 78 of the present invention provide improved output fluid impulses over prior systems. It is also to be noted that because the diameter of bleed ducts 56, 87 are very small, little flow occurs through the ducts under these dynamic conditions.

After the discharge cycle and return of gate means 28 to its load position, fluid pressure in accumulation chamber 75 is restored to about equal to that at inlet conduit means 23 in a short time.

To this end, the total discharge cycle time for a valve according to the present invention as described above, is not more than 0.01 seconds.

Although the invention has been described with reference to certain preferred embodiments, it would be apparent to persons skilled in the art that other variations in the valve of the invention are obvious and these are intended to be included by the present specification and claims. The device could be formed with a different orientation of the sections. For example, the output section could be turned 180° to be beside the solenoid or at 90° to be extended into or out of the page of FIG. 1 The accumulator chamber could be larger or smaller, it could have a different shape, or it could be connected to an external chamber or conduit. A manual actuator, pneumatic actuator or a hydraulic actuator or a camming device could be employed rather than a solenoid.

Figure 2:
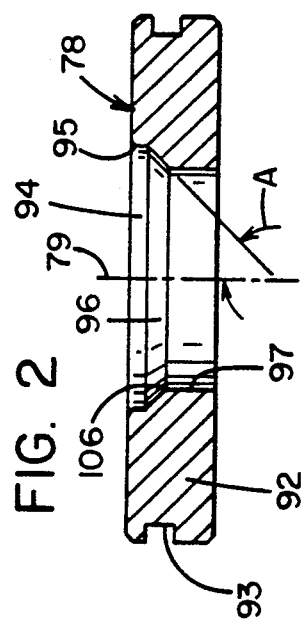
FIG. 2 is a cross-sectional view of a piston seat in accordance with the present invention.

Referring now to FIG. 2, piston seat 78 includes an annular body 92, an annular groove 93 in the body for receiving O-ring 77. The aperture of seat 78 going from the accumulator chamber 75 to the outlet port 74 is preferably defined by a cylindrical seat face 94 having a rounded or chamfered edge 95 merging into a frustoconical seat face 96 which merges into a cylindrical output orifice 97 for receiving piston extension portion 89. The angle A between the axial line 79 and the frustoconical seat face 96 is preferably the same as the angle of frustoconical seat 84, such as 45°. It has been found that the combination of a seat face 94 diameter of 0.89 inches, an output orifice diameter of 0.71 inches, and a output cavity 72 diameter of 1.0 inches provides a preferred piston opening speed and produces a higher output pressure impulse than valves in the prior art.

Referring now to FIGS. 1 and 2, during the discharge cycle, immediately after frustoconical portion 84 of piston 76 is unseated from seating portion 95, fluid enters the region 102 between the frustoconical portion 84 of piston 76 and the frustoconical portion 96 of piston seat 78, thereby causing a larger area differential than that previously defined by the difference in areas of the diameter of output cavity 72 and the diameter of the seat face 94, which serves to provide a greater force on piston 76 to accelerate it towards output conduit means 55. As the piston 76 accelerates, the bottom edge 104 clears the corner 106 of piston seat 78 in its travel and the fluid in accumulation chamber 75 is rapidly discharged. Because the piston has accelerated to a high velocity by the time edge 104 clears corner 106, the time required for the piston to reach its full open position is considerably reduced in comparison to the prior art. This characteristic of the valve of the present invention is significant, for it results in a valve which discharges the mass of fluid in accumulation chamber 75 at much higher rates and with higher output pressure peaks than previously attainable.

Figure 3:
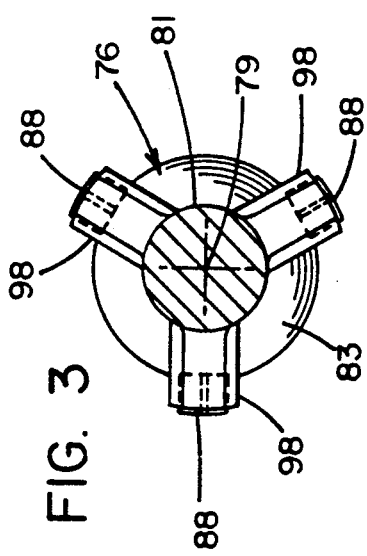
FIG. 3 is a top elevational view in partial cross section of a piston taken along line 3—3 of FIG. 1.

Referring now to FIG. 3, piston 76 includes middle cylindrical neck portion 81, end portion 83, at least three legs 98 protruding radially outward from end portion 83, and a plastic insert 88 provided in each leg. If three legs are provided, they should preferably be positioned about 120° apart as illustrated.

Figure 4:
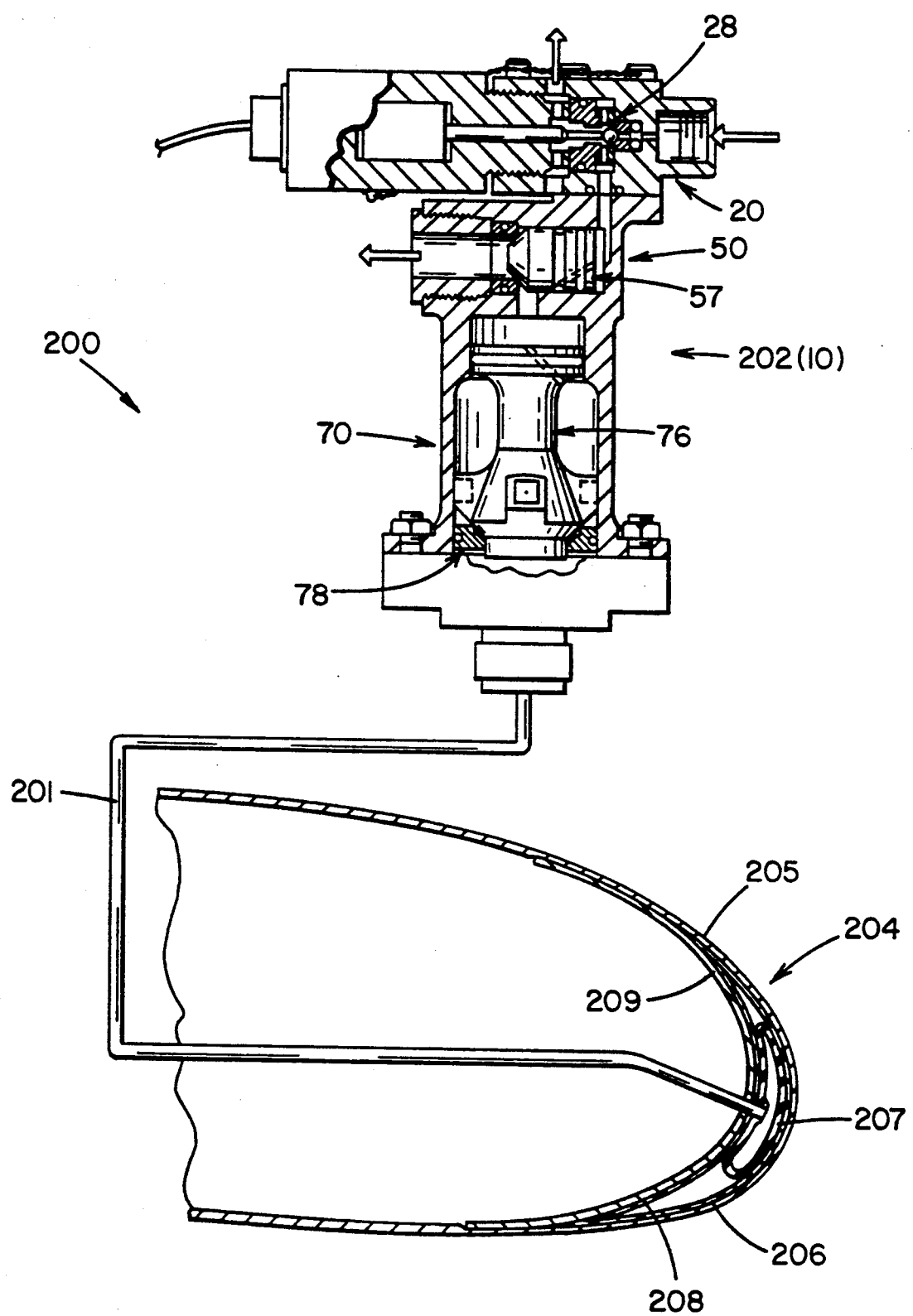
FIG. 4 is a combined schematic and sectional view of a valve and fluid impulse separation apparatus in accordance with the present invention.

Referring now to FIG. 4, there is shown a fluid impulse separation system 200 generally. The fluid impulse separation system 200 comprises a fluid impulse valve 202 in accordance with the present invention as illustrated in FIG. 1 joined by impulse conduit means 201 to a fluid impulse separation apparatus 204 which in the embodiment illustrated is an airfoil such as a wing of an aircraft. Fluid impulse separation apparatus 204 comprises an outer surface layer or skin 205 having the shape of an airfoil, an elastomeric layer 206 bonded to the obverse of skin 205, and fabric reinforced inflatable tube 207 and an elastomeric base layer 208. Base layer 208 is utilized for bonding the illustrated structure just described to a rigid backing such as the underlying support structure 209 of the airfoil. Further detailed description of suitable fluid impulse separation apparatuses is contained in U.S. Pat. Nos. 4,747,575, 4,807,515, 4,826,108, 4,836,474, 5,098,061, 4,878,647, 4,865,291, 4,878,647, 5,098,037 and 4,706,911, the teachings of which are herein incorporated by reference.

Although the invention has been shown and described with exemplary embodiments thereof, it should be understood by those skilled in the art that the foregoing and various other changes, omissions and additions may be made therein and thereto without departing from the spirit and scope of the invention.

What is claimed is:

1. A valve comprising pilot, intermediate and output sections, the pilot section including a pilot housing containing a pilot cavity, inlet conduit means extending from the exterior of the pilot housing to the pilot cavity, exhaust conduit means extending from the pilot cavity to the exterior of the pilot housing, and intermediate conduit means extending from the pilot cavity to said intermediate section, gate means configured for movement from a load position during which the inlet conduit means is in fluid communication with said intermediate conduit means and a discharge position during which the exhaust conduit means is in fluid communication with said intermediate conduit means while said inlet conduit means is disconnected from said intermediate conduit means;

the intermediate section including an intermediate housing containing an intermediate cavity having an inlet port in fluid communication with said intermediate conduit means, an exhaust vent, and an outlet port in fluid communication with output conduit means, the outlet port being proximate to the exhaust vent, and a poppet contained within said intermediate cavity configured for movement from a load position during which fluid under pressure may enter the intermediate cavity and force the poppet to seal off movement of fluid into the exhaust vent while permitting flow of fluid to the outlet port and a discharge position during which fluid under pressure may flow from said output conduit means to said vent;

the output section including an output housing containing an output cavity having an inlet orifice in fluid communication with said output conduit means, an outlet and accumulation means having an opening to said output cavity proximate to said outlet, and a piston contained within said output cavity and accumulation means configured for movement from a load position during which fluid under pressure may enter the output cavity through said inlet orifice and force the piston to seal off movement of fluid into the outlet while permitting flow of fluid into the accumulation means, and a discharge position during which fluid under pressure may flow from said accumulation means to said outlet, characterized by:

said poppet having: a) a poppet bleed duct extending through said poppet for providing restricted communication of fluid between said intermediate cavity and said output cavity; b) poppet sealing means for preventing leakage of fluid from said intermediate cavity and said output port from any way other than said bleed duct;

said piston having: a) a cylindrical head for being reciprocally received within said output cavity; b) a neck having at least three legs with each leg having a tip surface extending radially outward from said neck, said neck being reciprocally received within said accumulation means by means of contact between said tips with said accumulation means; c) a sealing face for sealing off movement of fluid into said outlet while said piston is in the load position; d) a piston bleed duct extending through said head for providing restricted communication of fluid between said output cavity and said accumulation means; and, piston sealing means for preventing leakage of fluid from said accumulation means to said output cavity, wherein said accumulation means is a chamber within the output housing defined substantially by the difference between the diameter of said neck and the inside diameter of the output housing.

2. The valve of claim 1 further including solenoid operably connected to the pilot section for movement of said gate means between its load and discharge positions.

3. The valve of claim 1 wherein said pilot section includes a pilot cavity, said inlet conduit means, said exhaust conduit means and said intermediate conduit means each being operably connected to said pilot cavity, said pilot cavity containing said gate means comprising a ball movable from a load position during which the ball permits movement of fluid from said inlet conduit means into said intermediate conduit means and a discharge position during which the ball prevents movement of fluid from said inlet conduit means into said intermediate conduit means while permitting movement of fluid from said intermediate conduit means to said exhaust conduit means.

4. The valve of claim 3 further including a solenoid operably connected to said pilot section, the solenoid having a core rod for moving the ball from its load position to its discharge position when energized and an O-ring adjacent the ball opposite the solenoid to dampen movement of the ball by the solenoid core rod.

5. The valve of claim 4 wherein the poppet and intermediate cavity are of cylindrical shape, one end of the intermediate cavity containing said inlet port, the opposite end of said intermediate cavity containing a circular poppet seat opening into said exhaust vent, the end of the poppet facing the poppet seat including a frustoconical face capable of sealing against fluid flow when engaged with said poppet seat, one end of the output cavity containing the inlet orifice, the opposite cavity containing a circular piston seat opening into said outlet, the end of the piston facing the piston seat including a frustoconical face capable of sealing fluid flow when engaged with said piston seat.

6. The valve of claim 5 wherein the pilot, intermediate and output sections are contained in a single housing.

7. The valve of claim 5 in which the housing of the pilot, intermediate and output sections is formed of metal and the poppet and piston are formed of plastic matrix.

8. The valve of claim 1 wherein the poppet and intermediate cavity are of cylindrical shape, the poppet outside diameter being on the order of 0.005 inches less than the inside diameter of the intermediate cavity, one end of the intermediate cavity containing said inlet port, the opposite end of the intermediate cavity containing a poppet seat opening into said exhaust vent, the end of the poppet facing the poppet seat including a frustoconical face capable of sealing fluid flow when engaged with said poppet seat.

9. The valve of claim 1 wherein the pilot, intermediate and output sections are contained in a single housing.

10. The valve of claim 1, which when its inlet is connected to a source of a compressible fluid at a pressure elevated substantially above atmospheric pressure, has a discharge cycle time of not more than 0.01 seconds.

11. The valve of claim 1 having an output section load position to discharge position response time not exceeding 0.001 second.

12. A valve according to claim 1, wherein:
said sealing face is frustoconical;
said piston further comprises cylindrical extension in axial alignment with said neck and being merged with said sealing face; and,
further comprising an annular piston seat means, wherein the inner surface of said piston seat means is defined by a seat aperture for receiving said cylindrical extension, a frustoconical seat face merged with said seat aperture, and a raised seat seal merged with said frustoconical seat face, said seat seal having a rounded inner edge for engagement with said sealing face of said piston.

13. A valve according to claim 1, wherein said piston is comprised of metal and said piston further comprising plastic inserts disposed in a cavity in each of said at least three legs, wherein said plastic inserts define said tip surface.

14. A valve according to claim 1, wherein the outside diameter of said poppet is at least 0.005 inches less than the inside diameter of said intermediate cavity.

15. A valve according to claim 1, wherein the diameter of said poppet bleed duct and said piston bleed duct are on the order of 0.031 inches.

16. A valve according to claim 1, wherein said poppet sealing means and said piston sealing means are comprised of an O-ring.

17. A valve according to claim 16, wherein said O-rings are comprised of high durometer elastomer.

18. A deicing system comprising:
a valve comprising pilot, intermediate and output sections,
the pilot section including a pilot housing containing a pilot cavity, inlet conduit means extending from the exterior of the pilot housing to the pilot cavity, exhaust conduit means extending from the pilot cavity to the exterior of the pilot housing, and intermediate conduit means extending from the pilot cavity to said intermediate section, gate means configured for movement from a load position during which the inlet conduit means is in fluid communication with said intermediate conduit means and a discharge position during which the exhaust conduit means is in fluid communication with said intermediate conduit means while said inlet conduit means is disconnected from said intermediate conduit means;
the intermediate section including an intermediate housing containing an intermediate cavity having an inlet port in fluid communication with said intermediate conduit means, an exhaust vent, and an outlet port in fluid communication with output conduit means, the outlet port being proximate to the exhaust vent, and a poppet contained within said intermediate cavity configured for movement from a load position during which fluid under pressure may enter the intermediate cavity and force the poppet to seal off movement of fluid into the exhaust vent while permitting flow of fluid to the outlet port and a discharge position during which fluid under pressure may flow from said output conduit means to said vent;
the output section including an output housing containing an output cavity having an inlet orifice in fluid communication with said output conduit means, an outlet and accumulation means having an opening to said output cavity proximate to said outlet, and a piston contained within said output cavity and accumulation means configured for movement from a load position during which fluid under pressure may enter the output cavity through said inlet orifice and force the piston to seal off movement of fluid into the outlet while permitting flow of fluid into the accumulation means, and a discharge position during which fluid under pressure may flow from said accumulation means to said outlet, characterized by:
said poppet having: a) a poppet bleed duct extending through said poppet for providing restricted communication of fluid between said intermediate cavity and said output cavity; b) poppet sealing means for preventing leakage of fluid from said intermediate cavity and said output port from any way other than said bleed duct;
said piston having: a) a cylindrical head for being reciprocally received within said output cavity; b) a neck having at least three legs with each leg having a tip surface extending radially outward from said neck, said neck being reciprocally received within said accumulation means by means of contact between said tips with said accumulation means; c) a sealing face for sealing off movement of fluid into said outlet while said piston is in the load position; d) a piston bleed duct extending through said head for providing restricted communication of fluid between said output cavity and said accumulation means; and, piston sealing means for preventing leakage of fluid from said accumulation means to said output cavity,
wherein said accumulation means is a chamber within the output housing defined substantially by the difference between the diameter of said neck and the inside diameter of the output housing; and,
fluid impulse separation apparatus comprising an outer surface layer and at least one inflatable tubular member positioned beneath the outer surface layer such that fluid impulse inflation of said tubular member causes reaction movement of said outer surface layer.

19. A deicing system in accordance with claim 18, further comprising a source of compressible fluid at a pressure substantially above atmospheric pressure.

* * * * *